J. D. McCANN, Jr.
COMBINATION RULE.
APPLICATION FILED MAR. 20, 1908.
914,359.
Patented Mar. 2, 1909.
Fig. 1.
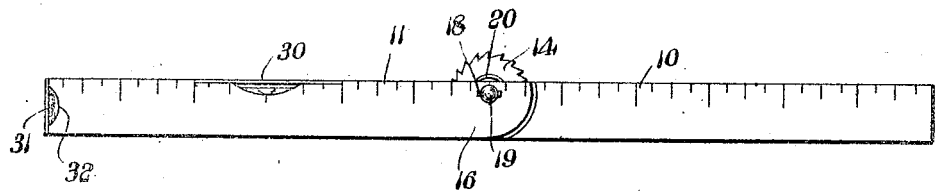
Fig. 2.
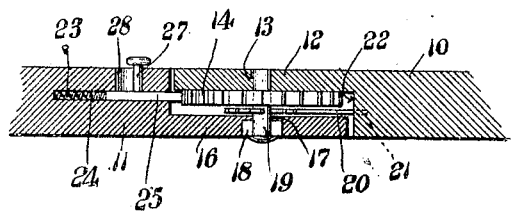
Fig. 3.
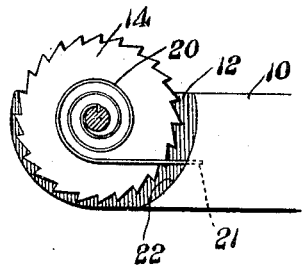
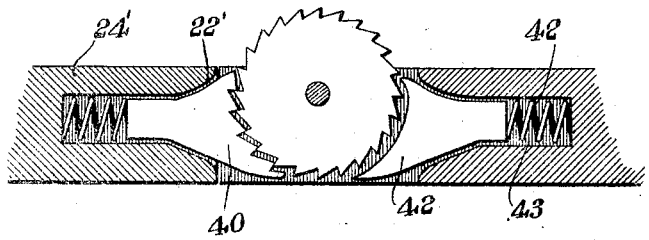
Fig. 4.
Witnesses
J. Adolph Bishop.
E. L. Chandler
Inventor
James D. McCann, Jr.,
By Woodward & Chandler
Attorney

UNITED STATES PATENT OFFICE.

JAMES D. McCANN, JR., OF OKTOC, MISSISSIPPI.

COMBINATION-RULE.

No. 914,359.   Specification of Letters Patent.   Patented March 2, 1909.

Application filed March 20, 1908. Serial No. 422,349.

*To all whom it may concern:*

Be it known that I, JAMES D. McCANN, Jr., a citizen of the United States, residing at Oktoc, in the county of Oktibbeha and State of Mississippi, have invented certain new and useful Improvements in Combination-Rules, of which the following is a specification.

This invention relates to measuring instruments, and more particularly to rules, and has for its object to provide a rule of pivoted form, arranged for use as a square and miter rule.

Another object is to provide such an article having a spring arranged therein under tension normally to open the rule and thus facilitate its use.

Another object is to provide means for securing the arms of the rule rigidly at various angles in the range of its adjustment.

Another object is to provide a rule having incorporated therein a level and plumb level to facilitate the accomplishment of calculations involving measurements of length and degree of variation from the horizontal or perpendicular.

Other objects and advantages will be apparent from the following description and it will be understood that changes in the specific structure shown and described may be made within the scope of the claims without departing from the spirit of the invention.

In the drawings forming a portion of this specification and in which like characters of reference indicate similar parts in the several views, Figure 1 is a plan view of the rule open to its fullest extent, Fig. 2 is a sectional view of the middle portion of the rule edgewise, Fig. 3 is a detail of the means for securing the spring in the rule, Fig. 4 is a detail sectional view of a modified form of a pawl to be used with this invention.

Referring now to the drawings, there is shown a rule having pivoted sections 10 and 11, the section 10 having one of its end portions rabbeted as shown at 12, the rabbeted extremity being provided with an opening 13. A disk 14 having peripheral teeth is secured upon the inner face of the rabbeted portion 12, the disk having an opening therethrough registering with the opening 13 in the rabbeted portion 12. The pivoted member 11 is provided with a rabbeted portion 16 similar to that of number 12, through which there is a perforation 17 having an angular extension arranged to receive a similarly formed head 18 of a pivot pin 19 engaged therethrough and through the opening 13, through the disk 14 and through the rabbeted portion 12. The pin 19 has a perforation laterally therethrough inwardly of the rabbeted portion 16 and has engaged therethrough the inner end of a spiral spring 20 the outer end of which is engaged in an opening 21 in the shoulder 22 at the inner end of the rabbeted portion 12. The spring 20 is normally under tension to force the rule into open position. The pivoted section 11 is provided with a longitudinally extending channel 24 having a pawl slidably engaged therein with its inner end in engagement with the teeth of the disk 14. A helical spring 23 is located in the opposite end of the channel and bears against the pawl 25 to hold it yieldably in engagement with the teeth of the disk portion. The pawl 25 has a laterally extending operating arm 27 which extends through a slot 28 communicating with the channel 24 through the face of the rule. It will be seen that by means of the operating arm 27 the pawl may be moved out of engagement with the teeth of the disk 14. A spirit level of the usual type is set in the inner edge of the rule as shown at 30. A plumb level is similarly arranged laterally of the rule as shown at 31, a perforation 32 being made through the rule to allow observation of the level.

It should be noted that the teeth of the disk 14 are arranged to engage with the pawl 25 to resist opening movement of the rule and to yield to closing movement.

A scale is formed on the edges of the outer side of the rabbeted portions to indicate the angle of the pivoted portions with relation to each other at any point in their movement.

It will be seen from the foregoing that a rule is provided which may be used as a projector and is susceptible of being quickly adjusted to angles of various degrees with great ease.

In Fig. 4 there is shown a pawl 40 engaged slidably in the handle 24, and provided with a large engaging head having a plurality of feet to engage the disk B, and arranged to extend around a section of the disk outwardly of the shoulder 22, and provided with suitable bases of length coinciding with any that may be placed upon the adjacent rule section. Oppositely of the pawl 40 there is a similar pawl 42 having an enlarged head provided with an outward smooth surface arranged for sliding engagement over the teeth of the ratchet disk, carried slidably in a slot 43 and having a helical spring 44 engaged inwardly thereof to engage slidably with the ratchet disk as shown. The pawl 42 serves the same purpose as the pawl 40, inclosing the space between the shoulder 22 at the opposite side of the disk.

What is claimed is:

1. A rule of pivoted sections, a spring engaged therebetween under tension to force said sections to open position, and a latch mechanism arranged to resist such movement until operated.

2. A ruler comprising pivoted sections, a spring engaged therebetween normally under tension to force said sections into open position, a ratchet carried by one section, a pawl carried by the other and adapted to engage with said ratchet to resist opening movement of the pivoted section, and means for disengaging said pawl from said ratchet.

In testimony whereof I affix my signature, in presence of two witnesses.

JAMES D. McCANN, Jr.

Witnesses:
  H. T. SAUNDERS,
  P. G. SUDDUITT.